United States Patent
Brillhart, III et al.

(10) Patent No.: US 6,562,435 B1
(45) Date of Patent: May 13, 2003

(54) METHOD FOR FORMING OR SECURING UNINDIRECTIONALLY-ORIENTED FIBER STRANDS IN SHEET FORM, SUCH AS FOR USE IN A BALLISTIC-RESISTANT PANEL

(75) Inventors: Lee Walker Brillhart, III, Seattle, WA (US); Ricky William Stewart, Mukilteo, WA (US); Ronald G. Krueger, New Braunfels, TX (US)

(73) Assignee: Survival, Incorporated, Seattle, WA (US)

( * ) Notice: Subject to any disclaimer, the term of this patent is extended or adjusted under 35 U.S.C. 154(b) by 0 days.

(21) Appl. No.: 09/528,782

(22) Filed: Mar. 17, 2000

Related U.S. Application Data
(60) Provisional application No. 60/125,403, filed on Mar. 20, 1999.

(51) Int. Cl.[7] .............................................. B32B 27/12
(52) U.S. Cl. ......................... 428/105; 2/2.5; 89/36.02; 428/105; 428/106; 428/109; 428/112; 428/113; 428/114; 428/297.4; 428/297.7; 428/298.1; 428/299.7; 428/911; 442/134; 442/135; 442/366
(58) Field of Search ................................ 428/105, 106, 428/109, 112, 113, 114, 911, 297.4, 297.7, 298.1, 299.7; 89/36.02; 2/2.5; 442/134, 135, 366

(56) References Cited

U.S. PATENT DOCUMENTS

| | | |
|---|---|---|
| 3,000,772 A | 9/1961 | Linn |
| 3,737,352 A | 6/1973 | Avis et al. |
| 3,796,624 A | 3/1974 | Avis et al. |
| 3,881,522 A | 5/1975 | Lewis et al. |
| 3,899,622 A | 8/1975 | Geiger |
| 3,919,028 A | 11/1975 | Lewis et al. |
| 3,930,091 A | 12/1975 | Lewis et al. |
| 3,988,519 A | 10/1976 | Stoller |
| 4,079,161 A | 3/1978 | Kile |
| 4,181,768 A | 1/1980 | Severin |
| 4,213,812 A | 7/1980 | Boultinghouse |
| 4,309,487 A | 1/1982 | Holmes |
| 4,403,012 A | 9/1983 | Harpell et al. |
| 4,457,985 A | 7/1984 | Harpell et al. |
| 4,522,871 A | 6/1985 | Armellino, Jr. et al. |
| 4,563,392 A | 1/1986 | Harpell et al. |
| 4,678,702 A | 7/1987 | Lancaster et al. |
| 4,820,568 A | 4/1989 | Harpell et al. |
| 4,916,000 A | 4/1990 | Li et al. |
| 5,437,905 A | 8/1995 | Park |
| 5,443,882 A | 8/1995 | Park |
| 5,443,883 A | 8/1995 | Park |
| 5,547,536 A | 8/1996 | Park |
| 5,591,933 A * | 1/1997 | Li .............................. 89/36.02 |
| 5,635,288 A | 6/1997 | Park |
| 5,935,678 A | 8/1999 | Park |
| 5,952,078 A | 9/1999 | Park |

FOREIGN PATENT DOCUMENTS

| | | |
|---|---|---|
| EP | 0 768 507 A1 | 4/1997 |
| JP | 183839 | 7/1989 |

* cited by examiner

*Primary Examiner*—Nasser Ahmad
(74) *Attorney, Agent, or Firm*—Perkins Coie LLP (57) ABSTRACT

A sheet of unidirectionally-oriented fiber strands includes unidirectional fibers, bonding fibers interwoven with the unidirectional fibers to form a fiber panel, and thermoplastic film laminating the fiber panel there between. In one embodiment, a second sheet of laminated unidirectional fibers is joined to the first sheet of laminated unidirectional fibers with the unidirectional fibers running in a second direction as compared to the first fibers. In yet another embodiment, individual laminated sheets of unidirectional fibers are stitched together to form packets of sheets which may be used singularly or multiple packets may be bundled together.

29 Claims, 5 Drawing Sheets

METHOD FOR FORMING OR SECURING UNINDIRECTIONALLY-ORIENTED FIBER STRANDS IN SHEET FORM, SUCH AS FOR USE IN A BALLISTIC-RESISTANT PANEL

This application claims the benefit of Provisional Application No. 60/125,403 filed Mar. 20, 1999.

TECHNICAL FIELD

This invention relates to forming or securing fiber strands in sheet form and more particularly, to forming or securing fiber strands in sheet form for use in a ballistic-resistant laminate.

BACKGROUND OF THE INVENTION

Unidirectional fiber materials are used in ballistic-resistant structures, and are disclosed, e.g., in U.S. Pat. Nos. 4,916,000, 4,079,161, 4,309,487, and 4,213,812. A non-woven ballistic-resistant laminate referred to by the trademark "Spectra-Shield" is manufactured by Allied-Signal, Inc. The laminate structure is used in soft body armor to protect the wearer against high-velocity bullets and fragments. "Spectra-shield" was made by first forming a non-woven unidirectional tape, which was composed of unidirectional polyethylene fibers and an elastic resin material that held the fibers together. The resin penetrated the fibers, effectively impregnating the entire structure with the resin product. Two layers, or arrays, of the unidirectional tape were then laminated together (cross-plied) at right angles to form a panel. The panel was then covered on both sides with a film of polyethylene. The film prevented adjacent panels from sticking together when the panels were layered in the soft body armor. The final panel was heavier and stiffer than desired for use as a ballistic-resistant panel. The weight and stiffness was due in part to the penetration of the entire structure with the resin product.

Non-woven ballistic-resistant laminates without resins are disclosed, e.g, in U.S. Pat. Nos. 5,437,905, 5,443,882, 5,443,883, and 5,547,536. A sheet of non-woven ballistic-resistant laminate structure was constructed of high performance fibers without using resins to hold the fibers together. Instead of resin, thermoplastic film was bonded to outer surfaces of two cross-plied layers of unidirectional fibers to hold the fibers in place. The film did not penetrate into the fibers. A sufficient amount of film resided between the bonded layers to adhere the layers together to form a sheet. Bonding the two layers of unidirectional fibers cross-plied to one another was necessary to meet structural requirements of the ballistic-resistant panel, such as impact force distribution. The individual sheets were placed loosely in a fabric envelope of an armored garment to form a ballistic-resistant panel.

SUMMARY

A ballistic-resistant laminate assembly having a plurality of laminate ballistic-resistant sheets. Each laminated ballistic-resistant sheet having a first layer with a plurality of substantially parallel fiber strands positioned immediately adjacent to each other, the fiber strands of the first layer having opposing first and second services. A first laminating film is adhered to the first surface of the fiber strands of the first layer. A second laminating film is adhered to the second surface of the fiber strands, with a first and second laminating films sandwiched in the fiber strands therebetween. The first and second laminating films retain the fiber strands in parallel orientation. Adjacent laminating ballistic-resistant sheets are positioned so one of the other laminating films from one sheet is immediately adjacent to a laminating film of the adjacent ballistic-resistant. The plurality of laminated ballistic-resistant sheets are joined together in one embodiment by stitching the ballistic-resistant sheets together forming a stack of the sheets.

BRIEF DESCRIPTION OF THE DRAWINGS

In the drawings, like reference numbers identify similar elements or steps. For ease in identifying the discussion of any particular element, the most significant digit in a reference number refers to the Figure number in which that element is first introduced (e.g., element 204 is first introduced and discussed with respect to FIG. 2).

DETAILED DESCRIPTION

The inventors have found limitations and inefficiencies with respect to the performance and to the manufacturing of the prior art ballistic-resistant panels. The laminate gave structure to the unidirectional fibers and served to prohibit adjacent sheets from sticking together, but it also facilitated movement between the sheets. Thus, the initial impact from, e.g., a bullet, to a ballistic-resistant panel comprised of loose laminated sheets displaced and rotated the sheets within the pocket such that the anti-ballistic characteristics were compromised for subsequent bullets. Additionally, the impact from the bullet bunched and pulled the individual fiber strands in the sheets and further degraded the integrity of the ballistic panel.

When an armor vest is tested in accordance with nationally recognized standards, the vest is shot six times at a pre-established distance and in a specific shot pattern. The inventors found with the prior art, that when the bullet pulled the fibers toward entry, the bullet significantly weakened the areas that fibers were pulled from such that by the fourth and fifth shot, bullets penetrated a raised weakened strike area.

Further, in the absence of resins or adhesives, the number of fibers per inch in a panel must be reduced to get opposing laminate sheets to fuse together. Increasing the density of the fibers to improve ballistic performance resulted in a panel that delaminated. To form the prior art sheets, fiber spools were unwound as thermoplastic sheets simultaneously laminated the fibers to provide alternating layers of fibers and thermoplastic sheets. It was not always feasible, economical or ballistically prudent to simultaneously bond the thermoplastic film on one side of the unspooling fibers. Without the thermoplastic film, however, the unspooled unidirectional fibers lacked structure and collapsed.

Under one aspect of the invention, a unidirectionally-oriented fiber panel includes unidirectional fibers and bonding fibers interwoven with the unidirectional fibers to form a unidirectionally-oriented fiber panel. Under another aspect of the invention, two thermoplastic sheets laminate the fiber panel between them . Under yet another aspect of the invention, several of the laminated unidirectionally-oriented fiber panels are stitched or otherwise bound together to form packets. Methods for forming or securing unidirectionally-oriented fiber strands in sheet form are described in detail below. In the following description, numerous specific details are provided, such as specific uses, fiber orientations, numbers of layers, etc., to provide a thorough understanding embodiments of the invention. One skilled in the relevant art will readily recognize that the invention can be practiced without one or more of the specific details. In other instances, well-known structures or operations are not shown or described in detail to avoid obscuring aspects of the invention.

Figure 1:
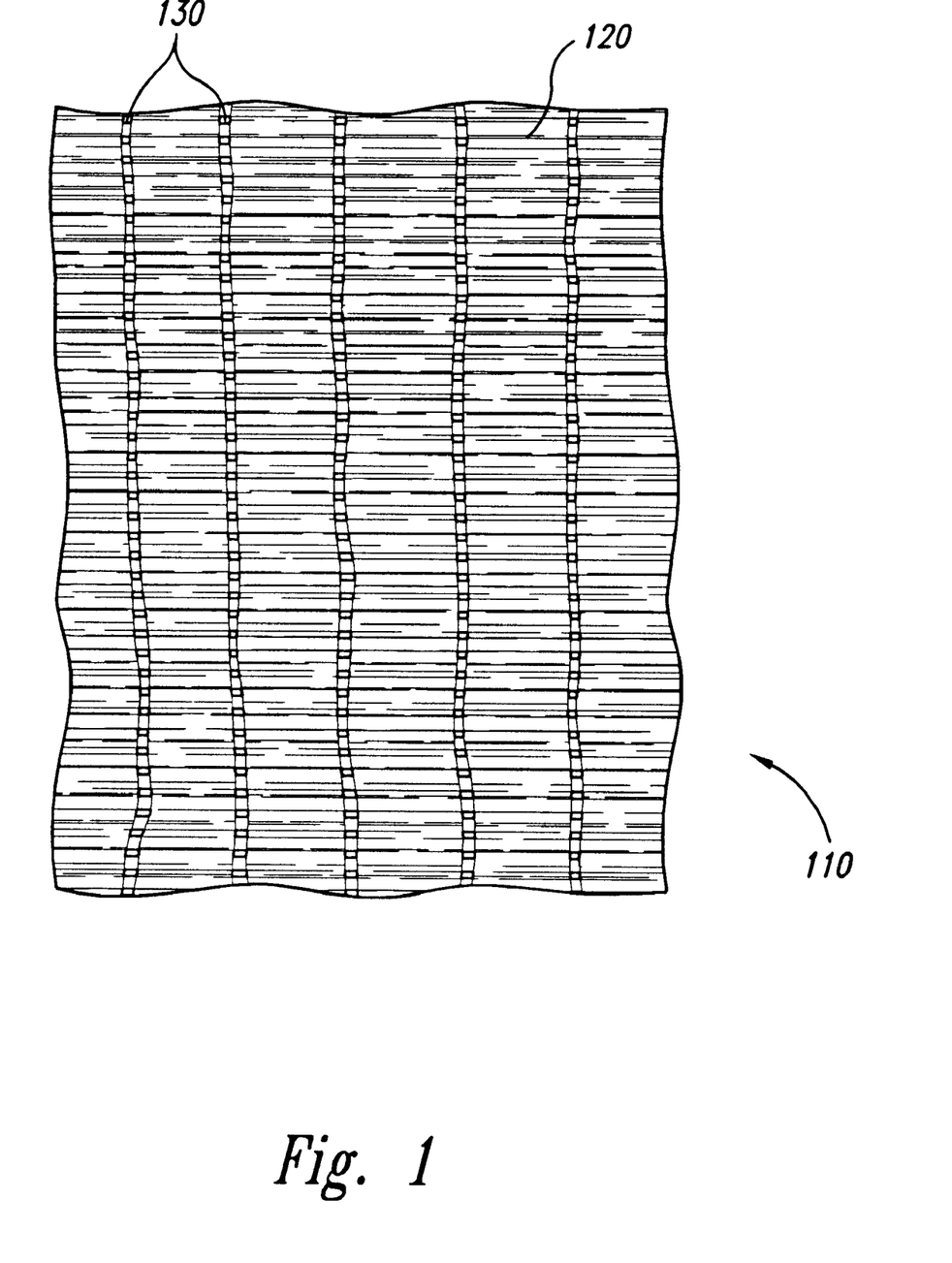
FIG. 1 is a plan view of a ballistic-resistant unidirectionally-oriented fiber panel including bonding fibers interwoven with the unidirectional fibers according to one embodiment of the invention.

As illustrated in FIG. 1, a flexible unidirectionally-oriented fiber panel 110 includes the bonding fibers 130 interwoven with unidirectional fibers 120. As the unidirectional fibers 120 are unspooled, they may be passed through a comb guide where the unidirectional fibers are further parallelized and spaced into a predetermined uniform density. In one embodiment, the unidirectional fibers 120 are aramid fibers, with a 1000 denier fiber construction and approximately 17 ends/inch unidirectional untwisted tows sheet construction. In another embodiment, the unidirectional fibers 120 are aramid fibers, with a 840 denier fiber construction and approximately 20 ends/inch unidirectional untwisted tows sheet construction.

As the unidirectional fibers 120 are unspooled to form a fiber sheet 110, the bonding fibers 130 are interwoven at an angle with respect to the unidirectional fiber 120. In the illustrative embodiment, the bonding fibers 130 are interwoven perpendicular to the unidirectional fibers 120 on approximately one inch centers. Preferably the bonding fibers 130 are spaced one-half inch to two inches, and more preferably, the bonding fibers 130 are evenly spaced one inch apart. In one embodiment, the bonding fibers 130 are an ethylene vinyl acetate with a polyester core. The coating may be made of natural or man-made polymers, copolymers, waxes or mixtures thereof. Representative examples include, but do not limit the scope of use to the following: styrene, butadiene, polybutadiene, polyvinylchloride, polyethylene, polypropylene, polyvinyl acetate (plasticized), acrylics, polyvinyl pyrrolidene compounds, natural latex, paraffin wax of the hot melt type, casein, carboxy cellulose esters and ethers. The core may alternatively be constructed out of nylon, cotton or aramid fiber.

After the bonding fibers 130 are interwoven with the unidirectional fibers 120, they are bonded into a unidirectionally-oriented fiber panel 110, for example, with heat and pressure from either static heat or an autoclave. The desired temperature range during heating is preferably up to 500° F., more preferably in the range of 225–375° F., and most preferably 265° F. under 45 psi of pressure. In addition to heat bonding the bonding fibers 130 to the unidirectional fibers 120, bonding can be effected by other methods depending upon the particular chemical composition of the fiber's coating. For example, bonding can be done by moisture, the use of organic solvents, high-pressure alone, or contact pressure. Such bonding techniques, however, should not adversely affect the unidirectional fibers 120 or destroy the configuration of the fibers that the bonding fibers 130 are to reinforce. Further, the coating of the bonding fibers 130 must bond with whatever surface coating or laminate is to be applied to the unidirectionally-oriented fiber panel 110.

Interweaving the bonding fibers 130 with the unidirectional fibers 120 allows the fiber panel 110 to be handled, transported, and processed either at a different location or at a later time. This feature provides advantages, including both efficiency and economy. Under traditional manufacturing methods, it was necessary to secure the thermoplastic film onto one side of the fibers at the same time the unidirectional fibers were unspooled to provide structure for the unidirectional fibers and to preserve the sheet configuration of the fibers. The bonding fibers 130 provide this structure to the unidirectional fibers 120. Thus, a thermoplastic film may be laminated to the unidirectional fibers 120 either at the same time as the unidirectional fibers 120 are unspooled or at a later time.

Figure 2:
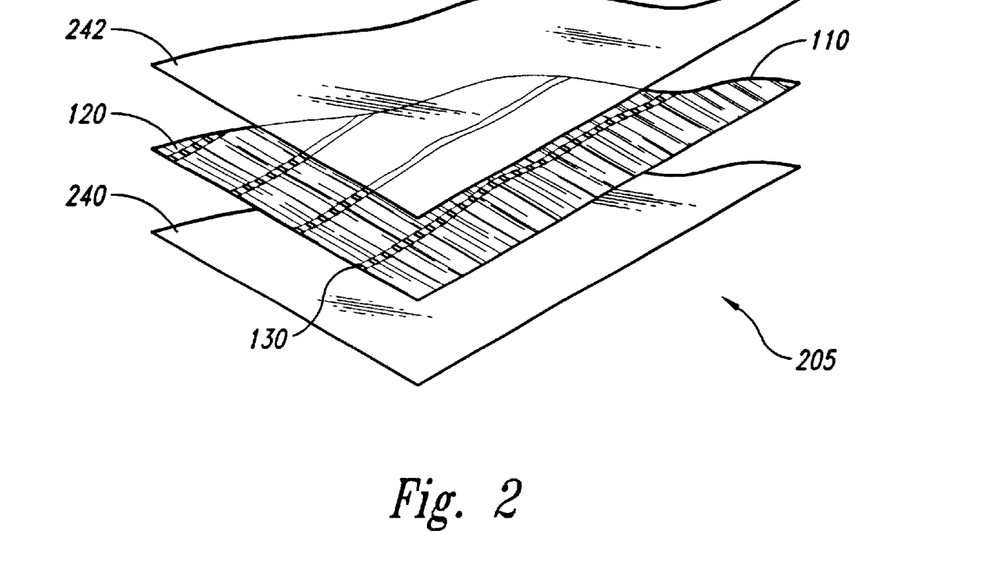
FIG. 2 is a partial, exploded isometric view of one embodiment including thermoplastic sheets laminating the unidirectionally-oriented fiber panel of FIG. 1.

As illustrated in FIG. 2, lower and upper thermoplastic films 240 and 242, respectively, are provided on top and bottom sides of the single fiber panel 110, and then secured or laminated thereto so the unidirectionally-oriented fibers are securely sandwiched between the films.

In one embodiment, the thermoplastic films 240 and 242 are extremely thin, typically less than 0.35 mils to maintain the flexibility of the laminated fiber ballistic-resistant panel. Alternatively, thicker films up to approximately 0.5 mils may be used to form a laminated fiber panel of greater rigidity. In one embodiment, the film will slightly coat the exterior surfaces of the unidirectional fibers 120 to encapsulate them, but will not impregnate the fibers. Sufficient plasticized film material flows between adjacent fibers 120 to bond the thermoplastics film 240 and 242 to the unidirectional fibers 120. The thermoplastic films 240 and 242 may be a polyethylene film. Due to the structure provided by bonding fibers 130, the thermoplastic films 240 and 242 may be laminated over the unidirectional fiber panel 110 either as the unidirectional fibers 120 are unspooled and interwoven with the bonding fibers 130 or at a later time. The thermoplastic films 240 and 242 laminate to each side of a panel 110 of unidirectional fibers 120 to form a flexible laminated unidirectionally-oriented fiber sheet 205. These flexible sheets 205 may be used individually or may be combined with other sheets as described below, to form a variety of items including ballistic-resistant panels.

The bonding fibers 130 further provide structure to which the thermoplastic films 240 and 242 can bond. Because the thermoplastic films 240 and 242 bond with the interwoven bonding fibers 130, the fiber panel 110 may contain a greater density of unidirectional fibers 120. The bonding fibers 130 of this embodiment thus provide at least two functions: the bonding fibers 130 help prevent the unidirectionally oriented fiber panel from spreading or delaminating before and after the thermoplastic films 240 and 242 laminate it, and the bonding fibers 130 provide the panel enhanced buoyant characteristics. The greater the density of the fibers 120 in the panel, the greater the amount of air that may be trapped between the fibers when the fiber panel 110 is laminated between the films 240 and 242. The bonding fibers 130 allow the density of the fibers 120 to be maximized by giving the fiber panel 110 further structure while preventing delamination of the laminated fiber panel by bonding with the thermoplastic film. The bond between the thermoplastic sheets 240 and 242 and the bonding fibers 130 create equally spaced sealed pockets of air which when used in a ballistic panel, produces buoyant ballistic panels.

Alternatively, if sufficient heat, or heat with sufficient pressure for a sufficient duration, is applied to the thermoplastic film 240 to melt the film 240 and 242 into the unidirectional fiber 120, a semi-rigid or rigid structure (not shown) is formed. Before heating the thermoplastic films 240 and 242, the laminated unidirectional fiber sheet 205 may be configured into any variety of shapes. This semi-rigid or rigid structure may be used alone or may be used in combination with other panels to form any variety of items including but not limited to cargo boxes, storage boxes, aircraft containers, water skis, snow skis, hockey sticks, vehicle bodies such as boat hulls, and protective elements such as helmets for racing, military use or bicycling.

Figure 3:
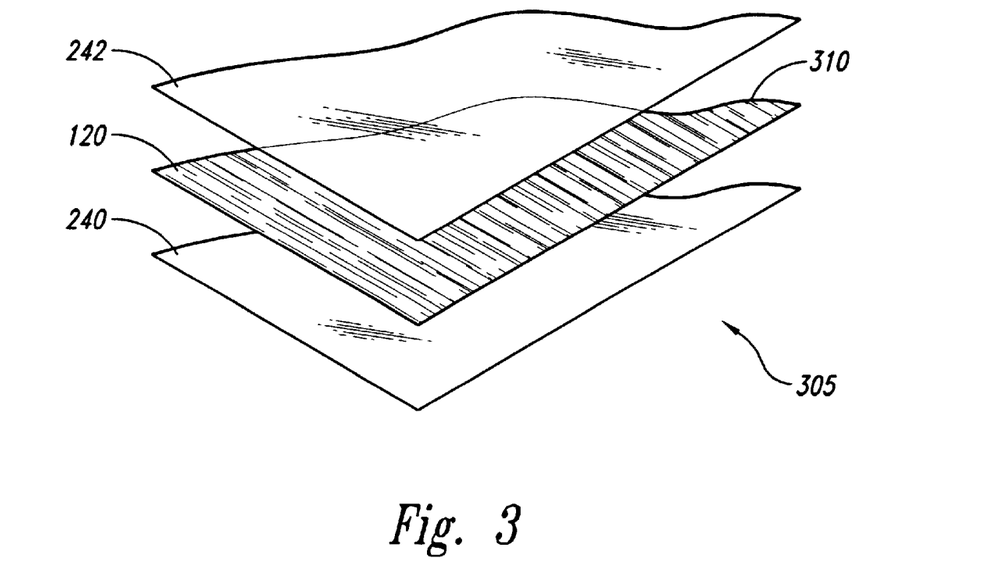
FIG. 3 is a partial, exploded isometric view of another embodiment of a laminated unidirectionally-oriented fiber panel without interwoven bonding fibers.

As illustrated in FIG. 3, an alternative embodiment includes a panel 310 of unidirectionally-oriented fibers 120 with lower and upper sheets of thermoplastic film 240 and 242 provided on a top and bottom surface of the fiber panel 310 to form a flexible laminated unidirectionally-oriented fiber sheet 305. This single layer unidirectional fiber panel 310 laminated on both sides by thermoplastic film 240 and 242 provides a sheet 305 with maximum flexibility while providing sufficient structure to prevent degradation of the unidirectional fiber sheet's 120 configuration. This unidirectional fiber panel 310 may be used individually or in combination with other fiber panels disclosed herein. Alternatively, the thermoplastic film 240 and 242 may be heated such that the thermoplastic film 240 and 242 will melt and encapsulate or impregnate the individual fiber strands 120 resulting in a rigid sheet (not shown).

The decision produce either a rigid or a flexible fiber sheet is typically dictated by the end use of the fiber sheet. Two or more sheets 305, such as the sheets used to form ballistic-resistant panels, for example, require flexible, pliable sheets for the wearer's comfort, while providing ballistic protection. Several sheets 305 used to form helmets, for example, require rigid sheets configured to fit the wearer's head.

Figure 4:
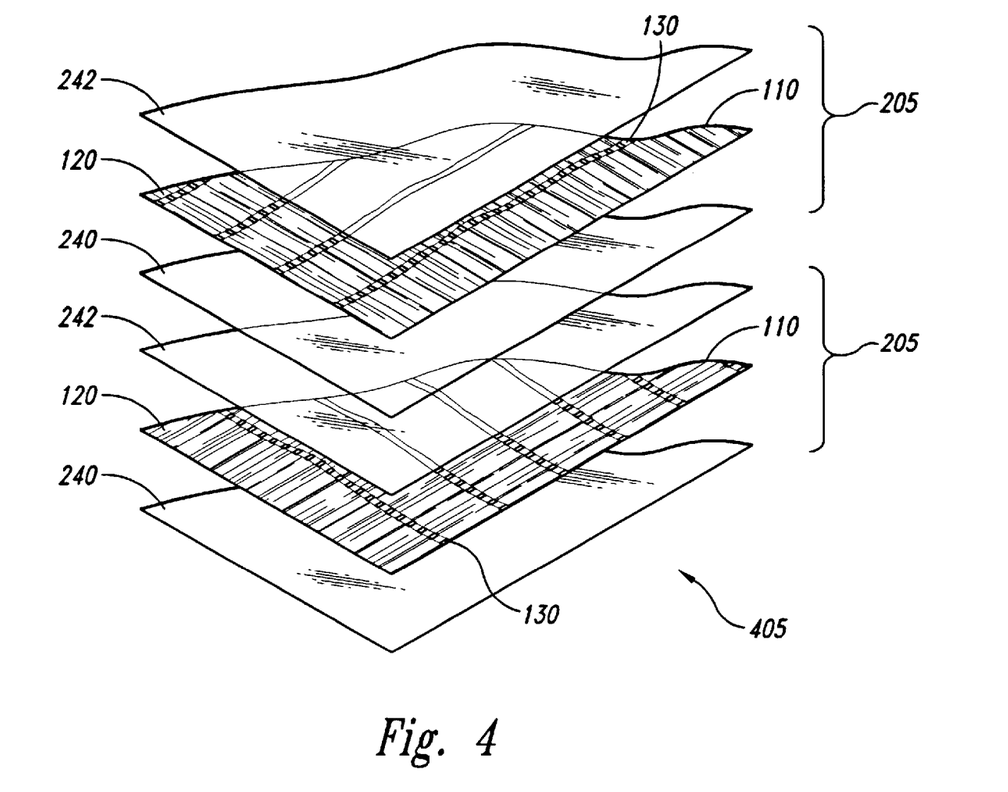
FIG. 4 is a partial, exploded isometric view of yet another embodiment. of a laminated fiber panel including first and second sets of laminated, unidirectionally-oriented fiber panels cross-plied relative to each together.

As illustrated in FIG. 4, yet another alternative embodiment bonds a laminated unidirectional fiber panel 205 with unidirectional fibers 120 oriented in a first direction (as illustrated in FIG. 1) with a second laminated unidirectional fiber panel 205 having unidirectional fibers 120 oriented in a second direction. As illustrated, the panels 205 each include bonding fibers 130 positioned perpendicular to the unidirectional fibers 120 and interwoven with the unidirectional fibers 120. As discussed with respect to FIGS. 1 and 2, the bonding fibers 130 provide structure to the unidirectional fibers 120 and allow the panel 110 to be manufactured without the thermoplastic film 240 or 242. Alternatively, if the thermoplastic film 240 or 242 is bonded to either a first or a second surface when the unidirectional fiber 120 is unspooled to form a panel, then the thermoplastic film 240 and 242 may be used to provide the structure to the panel and the bonding fibers 130 may be omitted.

When the unidirectional fibers 120 are interwoven with the bonding fibers 130 and layered between thermoplastic sheets 240 and 242 and laminated to produce a flexible sheet 405, the flexible sheet 405 has unexpected advantages, such as being easy to handle without damaging, loosening, or substantially degrading the effectiveness of the unidirectional fibers. The laminated structure is also quite buoyant because air is trapped within the sheet between the film. This characteristic is important for various end uses of the panels, for example, for use in a floatation device.

Figure 5:
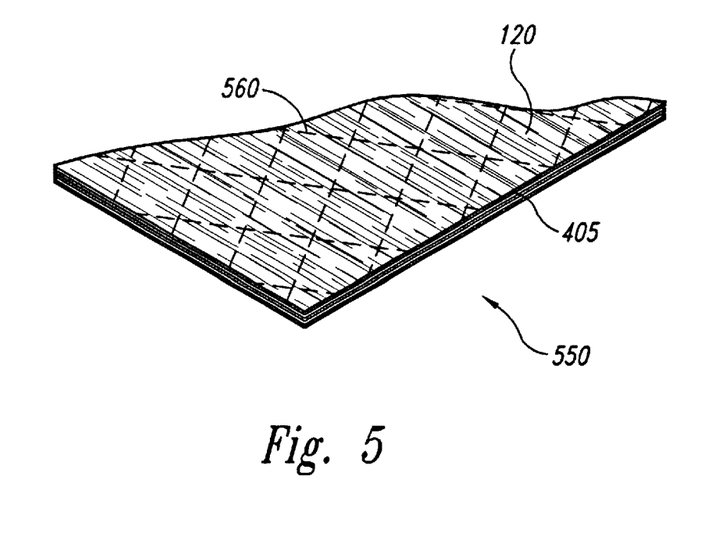
FIG. 5 is a partial isometric view of several laminated unidirectionally-oriented fiber panels stitched together to form a packet under one embodiment of the invention.

As illustrated in FIG. 5, yet another embodiment of the present invention includes several of [any one of] the unidirectionally-oriented fiber panels 405 stacked on top of one another with the fibers of each panel selectively oriented relative to the fiber of adjacent panels, such as parallel, perpendicular, or at other angles. The stack of panels 405 are secured together by stitches 560 to form a packet 550. In an alternate embodiment, adjacent panels 405 can be secured together with an adhesive provided between the adjacent thermoplastic films of two panels. The adhesive can be applied in selected patterns on the facing surfaces of the films, so as to control the stiffness or rigidity of the resulting stack of panels. The stack of panels 405 adhered together can also be stitched together at selected locations or patterns as needed for the particular application for which the packet 550 is to be used. Further, any one of the sheets illustrated in FIGS. 1–4 may be used in any combination to form the packet 550. Specifically, when using the unidirectionally-oriented fiber panel 405 illustrated in FIG. 4 to form the packet, preferably three to eight panels 405 are sewn together to form a packet 550, more preferably four to six panels 405, and most preferably five panels are used to form a packet 550. When using the unidirectionally-oriented fiber sheet 205 or 305 (FIG. 2 or 3) to form the packet for use in a ballistic panel, the sheets are placed such that the orientation of fibers is rotated a selected angle with respect to adjacent sheets.

Stitching the sheets 550 together to form packets 550 provides at least one unexpected result of providing improved resistance to ballistic penetration in a ballistic panel with fewer total fiber panels required, as described below. In one embodiment, preferably four to ten packets of fiber sheets 405 are used to form a ballistic panel, more preferably four to eight packets and most preferably six packets are used to form a ballistic panel. When a bullet hits a ballistic-resistant panel, the bullet penetrates the initial layers and the impact force of the bullet displaces secondary layers. When the ballistic panel is made up of several individual unidirectionally-oriented fiber sheets, the force of the bullet causes some fibers in the panel to push apart and separate, and other fibers at the tip of the bullet to bunch. Adjacent fibers that the bullet doesn't actually penetrate are pulled out of position and weakened by the impact force of the bullet. This creates a path of reduced resistance through the panel. The result is that the integrity of the ballistic-resistant panel is significantly impaired after the first impact. Packets of unidirectionally-oriented fiber sheets retain the benefit that the movement between the individual sheets allows, i.e. shifting the bullet off course and diffusing the straight line penetration of the bullet, while decreasing the penetration and the bunching caused by the bullet. The packets act like individual panels within the ballistic-resistant panel in that each individual packet acts independently of the adjacent packet. Thus the bullet's trajectory angles at each packet so that it doesn't create a path through the panel.

Fewer sheets are used to form a ballistic-resistant panel of equivalent characteristics compared to prior systems, therefore the resultant panel is more flexible and lighter in weight. When a bullet impacts a ballistic-resistant panel, the panel is subject to both the impact force of the bullet and a reverberating energy wave sent out ahead of the bullet. The components of the packet of this embodiment combine to provide a more efficient ballistic-resistant panel. Components include any one of or a combination of the following: density of the unidirectional fibers in the panel, bonding thread, the cross-plied positioning of the fiber panels, thermoplastic films, the laminated fiber panels stitched together in packets, and the interaction between the individual packets combine in a cooperative effort to provide an improved ballistic-resistant panel. Among other things, sewing the sheets in packets maximizes the anti-ballistic properties of the individual sheets such that the resultant packet is stronger than the sum of the individual sheets. Additionally, as fewer sheets are required, the ballistic-resistant panel is less expensive to manufacturer.

Stitching the sheets 405 to form a packet 550 may be done by any variety of stitching patterns and is illustrated in FIG. 5 as a diamond pattern. An alternative pattern includes vertical stitching perpendicular to the unidirectional fibers. Vertical stitching helps prevent the fibers from pulling side to side. Vertical stitches are preferably evenly spaced, more preferably evenly spaced 2"–4" apart and most preferably evenly spaced 3" apart. Stitching patterns may also include perimeter stitching, continuous and noncontinuous patterns, and any other variety of stitching patterns. In addition to stitching to secure the sheets together to form a packet, any one of a number of devices including but not limited to the following may be used: staples (permanent plastic or metal); dry or wet adhesive applied directly or on strips such as double-sided tape; various patterns of bar tacks; interlocking tabs in the sheets themselves or slots in the laminate; heat fusible thread on the exterior of select sheets; stacking two or more thermoplastic films and applying heat while pressing them together and taking advantage of the "sticky" properties of the film element of the laminate; fine Velcro or similar hook and loop material between the layers of sheets, snaps, any permutations and/or combinations of all of the above devices; induced static electrical charge; and interwoven magnetic material. Additionally, a wide variety of materials may be used for the stitching thread including natural and manmade fiber threads, polymer-based threads (such as fishing line), fine steel or other metal or composite or alloy wire, racket sports string (including natural, such as catgut, and synthetic materials).

Figure 6:
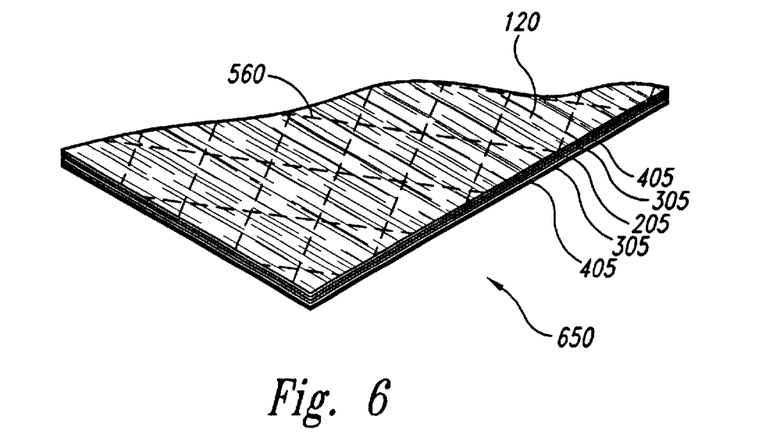
FIG. 6 is a partial isometric view of another embodiment of several laminated, unidirectionally-oriented fiber panels stitched together to form a packet.

FIG. 6 illustrates an alternative embodiment of a packet 650 of several unidirectionally-oriented fiber sheets affixed together. As discussed above, any combination of sheets may be used to form the packet 650, including but not limited to, this illustrated combination layering 405, 305, 205, 305 and 405. As the individual sheet configurations have specific features or strengths, the positioning of the sheets within the packet will serve to highlight those features or strengths.

Figure 7:
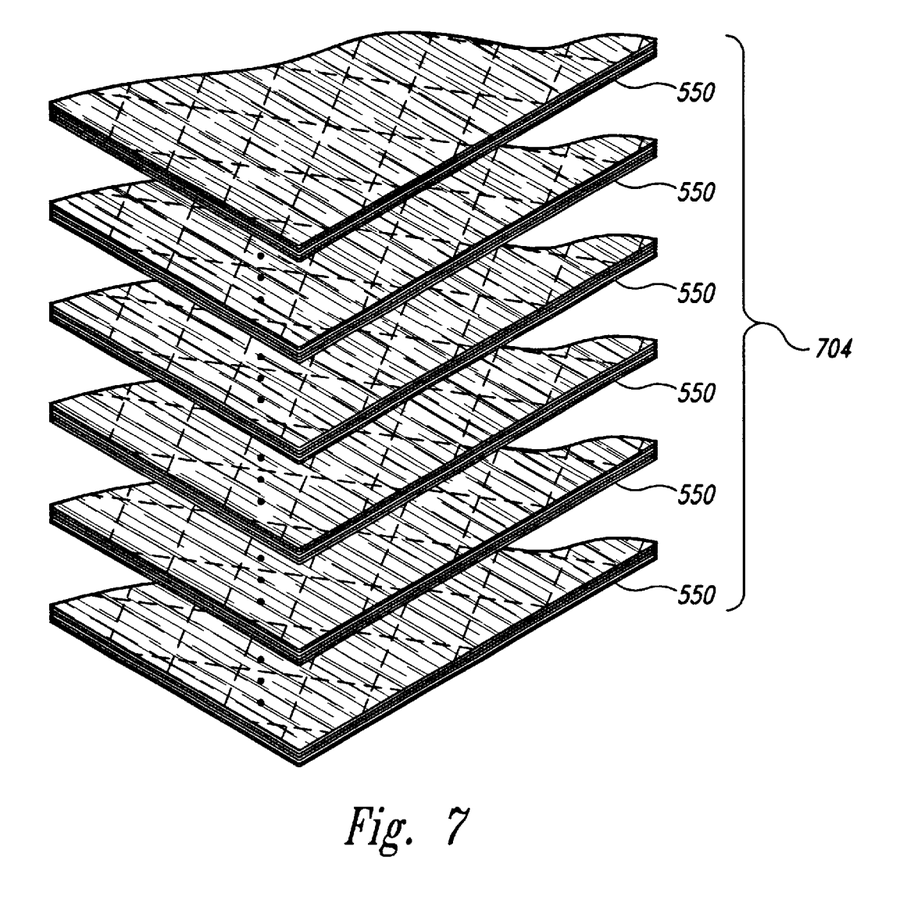
FIG. 7 is a partial, exploded isometric view of yet another embodiment of several stitched-together packets of laminated, unidirectionally-oriented fiber panels combined to form a ballistic-resistant panel.
Figure 8:
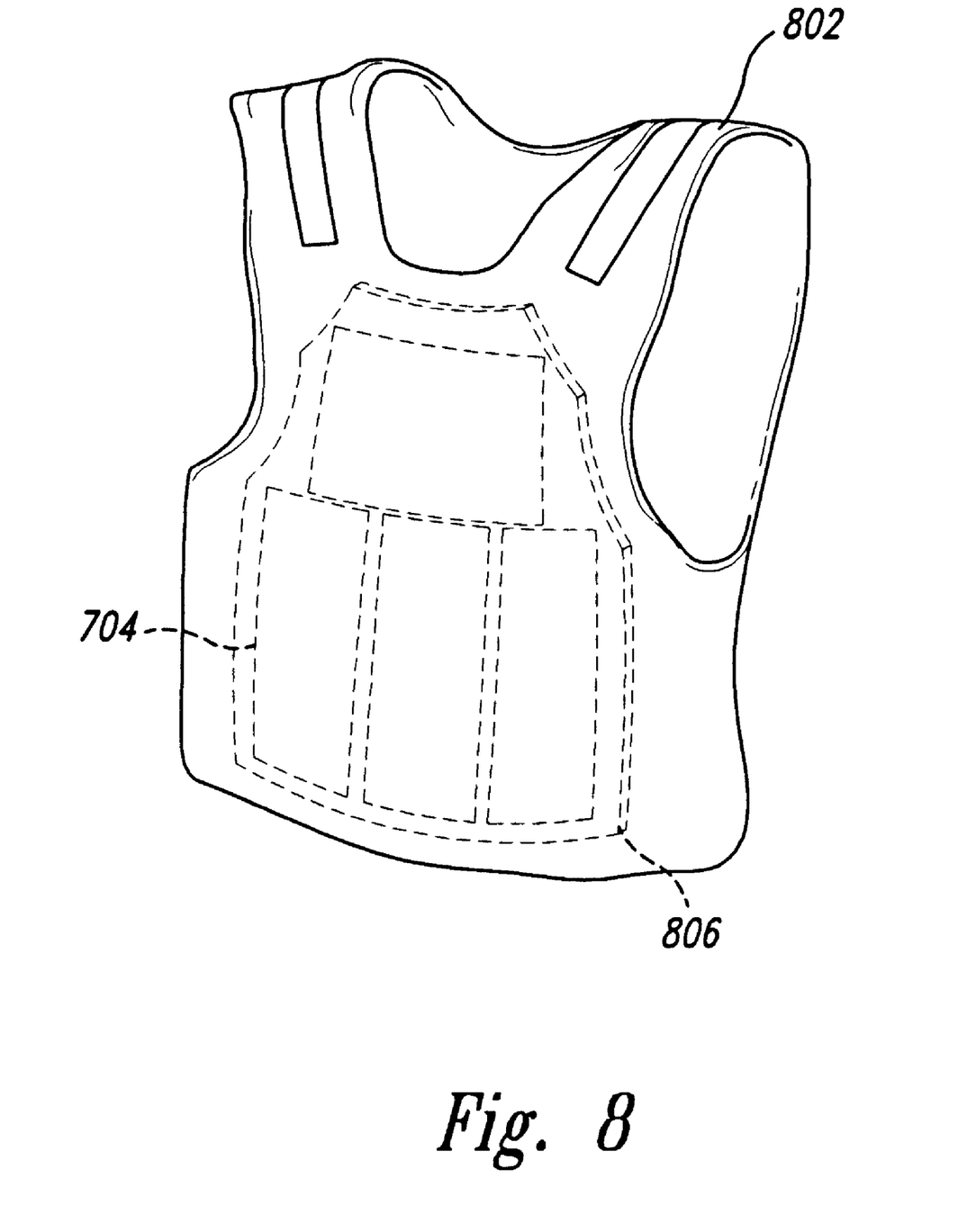
FIG. 8 is an armored body garment under one embodiment of the invention.

As illustrated in FIG. 7, the packets 550 or 650 are combined to form a ballistic-resistant panel 704. As is further illustrated in FIG. 8, one or more packets 550 or 650 can be bundled together and inserted in pockets 806 to form a ballistic-resistant panel 704. This ballistic-resistant panel 704 may be used as illustrated in a structure such as a vest 802. The packets increase ballistic-resistant efficiency by helping to hold the sheets in position. Traditionally, the first impact or shot to the ballistic-resistant panel 704 caused displacement and rotation of the sheets, which resulted in a less efficient ballistic-resistant panel 704 for second or subsequent sheets. The stitching 560 or otherwise securing the individual sheets to form packets 550 or 650, and then bundling the packets 550 or 650 together to form a ballistic-resistant panel 704, reduces the shifting and rotation caused by the initial shot.

The impact of the bullet indents the ballistic-resistant panel and causes some of the fibers in the ballistic-resistant panel to compact at the front of the bullet while stretching and pulling other fibers out of position as the bullet moves through the ballistic-resistant panel. Additionally, the indentation from the force of the bullet in the ballistic-resistant panel in one location causes a resulting protrusion of the panel's flat surface surrounding the indentation. This protrusion can buckle the surface of the entire panel depending on the entry location of the bullet. This buckling creates an air pocket between the panel and the wearer's chest which in turn impacts the integrity of the entire ballistic-resistant panel.

The various embodiments described above can be combined to provide further embodiments. All of the above U.S. Patents and applications are incorporated by reference. Aspects of the invention can be modified, if necessary, to employ the systems, circuits and concepts of the various patents and applications described above to provide yet further embodiments of the invention.

These and other changes can be made to the invention in light of the above detailed description. In general, in the following claims, the terms used should not be construed to limit the invention to the specific embodiments disclosed in the specification and the claims, but should be construed to include all unidirectionally-oriented fiber sheets that operate under the claims. Accordingly, the invention is not limited by the disclosure, but instead its scope is to be determined entirely by the following claims.

What is claimed is:

1. A ballistic-resistant laminate assembly, comprising:
   a substantially planar, non-woven first layer having a plurality of unidirectional fiber strands positioned adjacent to each other, the fiber strands of the first layer forming generally opposing first and second surfaces;
   a first laminate film adhered to the first surface of the first layer's fiber strands;
   a second laminate film adhered to the second surface of the first layer's fiber strands, with the first and second laminate films sandwiching the fiber strands therebetween and retaining the first layer's fiber strands in parallel orientation, the first layer and the first and second laminate films forming a first laminated ballistic-resistant sheet;
   a plurality of bonding fibers spaced apart from each other by a selected distance and connected to the fiber strands of the first layer, the bonding fibers being positioned at a predetermined angle relative to the fiber strands, the bonding fibers being sandwiched between the first and second laminate films;
   a substantially planar, non-woven second layer having a plurality of unidirectional fiber strands positioned adjacent to each other, the fiber strands of the second layer forming generally opposing third and fourth surfaces;
   a third laminate film adhered to the third surface of the second layer's fiber strands; and
   a fourth laminate film adhered to the fourth surface of the second layer's fiber strands, the third and fourth laminate films sandwiching the second layer's fiber strands therebetween and retaining the second layer's fiber strands in parallel orientation, the second layer and the third and fourth laminate films forming a second laminated ballistic-resistant sheet, the second laminated ballistic-resistant sheet being joined to the first laminated ballistic-resistant sheet with one of the third and fourth laminating films and one of the first and second laminate films separating the first and second fiber strands of the first and second layers.

2. The ballistic-resistant laminate assembly of claim 1 wherein the fiber strands of the first and second layers are aramid fibers.

3. The ballistic-resistant laminate assembly of claim 1 wherein the bonding fiber strands are an ethylene vinyl acetate with a polyester core.

4. The ballistic-resistant laminate assembly of claim 1 wherein the bonding fiber are substantially perpendicular to the first layer's strands.

5. The ballistic-resistant laminate assembly of claim 1 wherein the first and second laminate films are thermoplastic.

6. The ballistic-resistant laminate assembly of claim 1, wherein the first and second ballistic-sheets are stitched together.

7. The ballistic-resistant laminate assembly of claim 1, wherein first layer's fiber strands are oriented at a selected angle relative to the second layer's fiber strands.

8. The ballistic-resistant laminate assembly of claim 1, wherein the first layer's fiber strands are perpendicular to the second layer's fiber strands.

9. The ballistic-resistant laminate assembly of claim 1 wherein the first and second laminated ballistic-resistant sheets are joined with a plurality of other unidirectional laminated ballistic-resistant sheets for form a multi-layer, ballistic-resistant panel.

10. A flexible multiple-layer ballistic-resistant panel comprising:
- a flexible first unidirectionally-oriented fiber strand laminate sheet including a plurality of unidirectional first fiber strands positioned substantially parallel to each other and forming generally opposing first and second surfaces, a plurality of spaced-apart bonding fibers connected to the first fiber strands and positioned at an angle relative to the first fiber strands, and a first laminate film adhered to the first surface of the first fiber strands therebetween;
- a flexible second unidirectionally-oriented fiber strand laminate sheet positioned immediately adjacent to the first laminate sheet having a plurality of unidirectional second fiber strands positioned substantially parallel to each other and forming generally opposing third and fourth surfaces, a plurality of spaced-apart bonding fibers connected to the second fiber strands and positioned at an angle relative to the second fiber strands, and a second laminate film adhered to the third surface of the second fiber strands; and
- a joining member securely retaining the first and second fiber strand laminate sheets together with one of the first and second laminate sheets being immediately adjacent to one of the third and fourth laminate sheets.

11. The ballistic-resistant panel of claim 10 wherein the joining member is a stitching thread.

12. The ballistic-resistant panel of claim 10 wherein the first fiber strands are oriented at an angle of 90 degrees relative to the second fiber strands.

13. The ballistic-resistant panel of claim 10, wherein the first fiber strands are oriented at a selected angular orientation relative to the second fiber strands.

14. The ballistic-resistant panel of claim 10, wherein the joining member is stitching forming a diamond pattern on one of the first and second laminate sheets.

15. The ballistic-resistant panel of claim 10, wherein the first and second laminate films are thermoplastic.

16. The ballistic-resistant panel of claim 10, wherein the first fiber strands are aramid fibers.

17. The ballistic-resistant panel of claim 10 wherein the first bonding fibers are substantially perpendicular to the first fiber strands.

18. The ballistic-resistance panel of claim 10, further comprising a third laminate film adhered to the fourth surface of the second fiber strands, the second and third laminate sheets sandwiching the second fiber strands and second bonding fibers therebetween.

19. A ballistic-resistant laminate assembly, comprising:
- a substantially planar, non-woven first layer having a plurality of unidirectional fiber strands positioned adjacent to each other, the fiber strands of the first layer forming generally opposing first and second surfaces;
- a first laminate film adhered to the first surface of the first layer's fiber strands and retaining the first layer's fiber strands in parallel orientation, the first layer and the first laminate film forming a first laminated ballistic-resistant sheet;
- a plurality of bonding fibers spaced apart from each other and connected to the fiber strands of the first layer, the bonding fibers being positioned at a predetermined angle relative to the fiber strands;
- a substantially planar, non-woven second layer having a plurality of unidirectional fiber strands positioned adjacent to each other, the fiber strands of the second layer forming generally opposing third and fourth surfaces; and
- a second laminate film adhered to the third surface of the second layer's fiber strands and retaining the second layer's fiber strands in parallel orientation, the second layer and the second laminate film forming a second laminated ballistic-resistant sheet, the second laminated ballistic-resistant sheet being joined to the first laminated ballistic-resistant sheet with the second laminating film being between the fiber strands of the first and second layers.

20. The ballistic-resistant laminate assembly of claim 19 wherein the bonding fibers are substantially perpendicular to the first layer's fiber strands.

21. The ballistic-resistant laminate assembly of claim 19 wherein the first and second laminate films are thermoplastic.

22. The ballistic-resistant laminate assembly of claim 19 wherein the first and second ballistic-resistant sheets are stitched together.

23. The ballistic-resistant laminate assembly of claim 19 wherein the bonding fibers are first bonding fibers, and further comprising a plurality of second bonding fibers spaced apart from each other and connected to the fiber strands of the second layer, the second bonding fibers being positioned at a predetermined angle relative to the second layer's fiber strands.

24. The ballistic-resistant laminate assembly of claim 19 wherein first layer's fiber strands are oriented at a selected angle relative to the second layer's fiber strands.

25. A flexible, multiple-layer ballistic-resistant panel comprising:
- a first flexible, unidirectionally-oriented fiber strand laminate sheet including a plurality of unidirectional first fiber strands positioned substantially parallel to each other and forming generally opposing first and second surfaces, a plurality of spaced-apart first bonding fibers connected to first fiber strands and positioned at an angle relative to the first fiber strands, and a first laminate film adhered to the first surface; and a second flexible, unidirectionally-oriented fiber strand laminate sheet positioned adjacent to the first flexible, unidirectionally-oriented fiber strand laminate sheet having a plurality of unidirectional second fiber strands positioned substantially parallel to each other and forming generally opposing third and fourth surfaces, a plurality of spaced-apart second bonding fibers connected to the second fiber strands and positioned at an angle relative to the second fiber strands, and a second laminate film adhered to the third surface.

26. The ballistic-resistant panel of claim 25 wherein the first fiber strands are oriented at an angle of 90 degrees relative to the second fiber strands.

27. The ballistic-resistant panel of claim 25 wherein the first and second laminate films are thermoplastic.

28. The ballistic-resistant panel of claim 25 wherein the first bonding fibers are substantially perpendicular to the first fiber strands.

29. The ballistic-resistant panel of claim 25 wherein the second unidirectionally-oriented fiber strand laminate sheet has a third laminate film adhered to the fourth surface, with the second and third laminating films sandwiching the second fiber strands and second bonding fibers therebetween.

* * * * *